United States Patent
Gray et al.

(10) Patent No.: US 6,547,854 B1
(45) Date of Patent: Apr. 15, 2003

(54) AMINE ENRICHED SOLID SORBENTS FOR CARBON DIOXIDE CAPTURE

(75) Inventors: McMahan L. Gray, Pittsburgh, PA (US); Yee Soong, Monroeville, PA (US); Kenneth J. Champagne, Fredericktown, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/966,570

(22) Filed: Sep. 25, 2001

(51) Int. Cl.$^7$ ............................ B01D 53/04; B01J 20/22
(52) U.S. Cl. ...................... 95/139; 95/148; 423/230; 502/408; 502/411
(58) Field of Search ..................... 95/90, 139, 148, 95/285; 423/220, 228, 229, 230; 502/64, 407, 408, 411, 416, 85, 439

(56) References Cited

U.S. PATENT DOCUMENTS

| | | | | |
|---|---|---|---|---|
| 3,491,031 A | * | 1/1970 | Stoneburner | |
| 4,264,377 A | | 4/1981 | Schafer | |
| 4,305,827 A | * | 12/1981 | Sasaki | 210/688 |
| 4,320,011 A | | 3/1982 | Sato et al. | |
| 4,668,255 A | * | 5/1987 | Govind | 252/190 |
| 4,810,266 A | * | 3/1989 | Zinnen et al. | 423/230 |
| 4,999,175 A | * | 3/1991 | Vansant et al. | 423/230 |
| 5,462,908 A | * | 10/1995 | Liang et al. | 502/401 |
| 5,876,488 A | * | 3/1999 | Birbara et al. | 422/178 |
| 6,291,383 B1 | * | 9/2001 | Zapf et al. | 502/103 |
| 6,364,938 B1 | * | 4/2002 | Birbara et al. | 423/228 |
| 6,402,813 B2 | * | 6/2002 | Monereau et al. | 95/117 |

FOREIGN PATENT DOCUMENTS

| | | | |
|---|---|---|---|
| JP | 61227822 A | * | 10/1986 |
| JP | 6-121843 A | * | 5/1994 |
| JP | 2000-262834 A | * | 9/2000 |

* cited by examiner

Primary Examiner—David A. Simmons
Assistant Examiner—Frank M. Lawrence
(74) Attorney, Agent, or Firm—Joy Alwan; Thomas G. Anderson; Paul A. Gottlieb

(57) ABSTRACT

A new method for making low-cost $CO_2$ sorbents that can be used in large-scale gas-solid processes. The new method entails treating a solid substrate with acid or base and simultaneous or subsequent treatment with a substituted amine salt. The method eliminates the need for organic solvents and polymeric materials for the preparation of $CO_2$ capture systems.

15 Claims, 4 Drawing Sheets

AMINE ENRICHED SOLID SORBENTS FOR CARBON DIOXIDE CAPTURE

CONTRACTUAL ORIGIN OF INVENTION

The United States Government has rights in this invention through an employer-employee relationship between the U.S. Department of Energy and The National Energy Technology Laboratory.

BACKGROUND OF THE INVENTION

1. Field of the Invention

The invention relates to an improved method for the production of low cost $CO_2$ amine-enriched sorbents that can be used in large-scale processes, and, more specifically, this invention relates to a method for the use of an aqueous system to incorporate the needed functionality group, an amine, onto the surfaces of oxidized solids.

2. Background of the Invention

Separation and capture of $CO_2$ have been identified as a high-priority research topic in Department of Energy (DOE) reports. The costs of separation and capture, including compression to the required pressure for the sequestration step, estimated to comprise about three-fourths of the total cost of ocean or geologic sequestration. An improvement of the separation and capture of $CO_2$ will reduce the total cost required for sequestration.

The most likely options for $CO_2$ separation and capture include chemical absorption, physical and chemical adsorption, low-temperature distillation, gas-separation membranes, mineralization/biomineralization, and vegetation. The $CO_2$ absorption process using aqueous amine solutions have been used for the removal of $CO_2$ from gas streams in some industries. This process, based on the principles of chemical absorption of $CO_2$ via monoethanolamine (MEA) or diethanolamine (DEA), is a potential technique for capturing greenhouse gas emissions from flue gas streams.

Wet chemical stripping of $CO_2$ involves one or more reversible chemical reactions between $CO_2$ and another substance such as MEA to produce a liquid species, such as a carbonate. Upon heating, the carbonate (heretofore isolated from the $CO_2$ feed stream) breaks down to free $CO_2$, with the original amine regenerated to react with additional $CO_2$. An example of the process, with monoethanol amine, is:

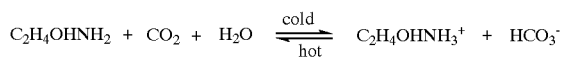

Typically, these amines, MEA and DEA, are used as 25 to 30 wt. % amine in aqueous solution. The amine solution enters the top of an absorption tower while the carbon dioxide containing gaseous stream is introduced at the bottom. During contact with the $CO_2$-containing gaseous stream, the amine solution chemically absorbs the carbon dioxide from the gaseous stream. Desorption of the adsorbed carbon dioxide proceeds through a thermal regeneration process. Carbon dioxide and water emerge from the amine solution and the water is separated by condensing the water vapor in a heat exchanger. After regeneration the amine solution is recycled back to the absorption tower for additional carbon dioxide absorption.

Carbon dioxide capture and regeneration in the above-described manner Carbon dioxide capture and regeneration in the above-described manner requires high temperatures or very low vacuum. The process is more complicated and costly. The steps outlined supra are energy intensive. Further, the amine solution has a limited lifetime due to degradation through oxidation of the amine. In addition, corrosion problems are usually observed for the aqueous amine process.

Several solid sorbents have recently been utilized to remove carbon dioxide from enclosed environments. Important considerations include the ability to regenerate an absorbent and the ease of its regeneration. Efforts have been made to reversibly adsorb $CO_2$ on a silica gel first modified with amine. O. Leal, et al., *Inorganica Chimica Acta*, 240, 183–189, 1995. Surface modification occurs when the hydroxyl moieties of the silica gel surface bonds with chemical moieties. When the chemical moiety is 3-aminopropyltriethoxysilane, bonding occurs between the oxygen atoms of the ethoxy moieties and silicon atoms at the surface of the gel. It is this surface modification that facilitates adsorption of $CO_2$ via the formation of carbamate species.

U.S. Pat. No. 3,491,031 awarded to Stoneburner on Jan. 20, 1970 discloses a method to create a $CO_2$ sorbent by treating activated carbon with gaseous alcohol amines such as MEA. It emphasizes using a reaction between gaseous $CO_2$ and an amine-enriched solid, but utilizes a wet-chemical stripping method employing MEA to remove the $CO_2$ and regenerate the sorbent.

U.S. Pat. No. 5,886,061 awarded to Beckman on Mar. 23, 1999 discloses a method to create $CO_2$ sorbents by the incorporation of amine groups into a polymer substrate or backbone.

U.S. Pat. No. 5,876,488 awarded to Birbara et al. on Mar. 2, 1999 discloses a method to create $CO_2$ sorbents by dispersing aqueous amines in polymeric materials.

U.S. Pat. Nos. 5,620,940, 5,492,683 and 5,376,614, all awarded to Birbara et al. disclose methods to create $CO_2$ sorbents by using amine-polyols on chemically inert supports.

U.S. Pat. No. 4,810,266 awarded to Zinnen, et al. on Mar. 7, 1989 discloses a method to create $CO_2$ sorbents by treating carbonized molecular sieves with alcohol amines.

U.S. Pat. No. 4,531,953 awarded to Groose, et al. on Jul. 30, 1985 discloses a method to sequester toxic gases with solid sorbents which are produced by treating metal-impregnated activated carbons with anhydrous amines.

None of the aforementioned patents disclose a method using oxidized solids.

U.S. Pat. No. 4,320,011 awarded to Sato, et al. on Mar. 16, 1982 discloses a method to create an oil-containing waste water treatment material by treating activated carbons with aqueous amine solutions. It discloses treating graft-polymerized activated carbons with aqueous amines in order to obtain solid sorbents. It does not disclose a simple surface oxidation of the solid substrate.

A need exists in the art for a method to produce amine-enriched sorbents for the capture of $CO_2$ from fluids. In particular, a need exists for a method to prepare such sorbents by simple chemical treatment of an already oxidized substrate surface with amine compounds. In addition, a need exists for a sorbent which retains $CO_2$ over a range of operating temperatures. Finally, a need exists for a method which does not use expensive organic solvents and polymeric materials and in which the sorbent produced is thermally stable, and easily regenerated.

SUMMARY OF INVENTION

An object of the present invention is to provide a method for synthesizing amine-enriched sorbents that overcomes many of the disadvantages of the prior art.

Another object of the present invention is to provide a new method for synthesizing amine-enriched sorbents. A feature of the invention is the elimination of the need for organic solvents and polymeric materials for the preparation of $CO_2$ capture systems. An advantage is that the new method is inexpensive.

Still another object of the present invention is to provide a method for creating many different $CO_2$ absorbing materials. A feature of the invention is the suitability of a large selection of solid substrates and amine-based compounds as absorbing material building blocks. An advantage of the invention is that a greater range of $CO_2$ absorbing capabilities can be provided.

Yet another object of the present invention is to provide a method which produces sorbents which absorb over a range of temperatures. A feature of the invention is that the sorbents provided by this method adsorb $CO_2$ from 20° C. to 80° C. via a combination of both physical and chemical adsorption processes. An advantage of the invention is that these sorbents can adsorb at temperatures above normal ambient temperatures, and well above 30° C.

Still another object of the present invention is to provide a method which gives a sorbent which is easily regenerated. A feature of the invention is that regeneration of the sorbent can be accomplished in an anhydrous environment or by heating above 80° C. An advantage of the invention is that the regeneration process is inexpensive.

Yet another object of the present invention is to provide a method which gives sorbents which are thermally stable. A feature of the invention is that the sorbents provided by this method can be heated to temperatures above 100° C. with little or no degradation. An advantage of the invention is that these sorbents have a longer life span of usefulness which results in lower costs.

Briefly, the invention provides a process for producing an amine-enriched sorbent which comprises treating an oxidized surface with base, and; treating the surface with a substituted amine salt.

The invention also provides a process for producing an amine-enriched sorbent which comprises treating a surface with a substituted amine salt in the presence of a catalyst.

BRIEF DESCRIPTION OF DRAWINGS

The invention together with the above and other objects and advantages will be best understood from the following detailed description of the preferred embodiment of the invention shown in the accompanying drawings, wherein.

DETAILED DESCRIPTION OF THE INVENTION

This invention provides a new method for the production of novel $CO_2$ capture sorbents. The new method utilizes a simple two-step chemical treatment of solids to give an effective, efficient, and stable regenerable $CO_2$ sorbent. As such, the invention can be applied to a myriad of fluids, such as flue gas streams and natural gas, and under a variety of conditions. The invention employs amine functionalities attached to a support substrate which also serves as part of the sorbent. The substrate also provides the amine with structural integrity and a high surface area for gas/solid contact.

The sorbents are produced via simple ionic reactions whereby amine is incorporated onto a solid substrate. Typically, the process is conducted in aqueous media.

Figure 1:
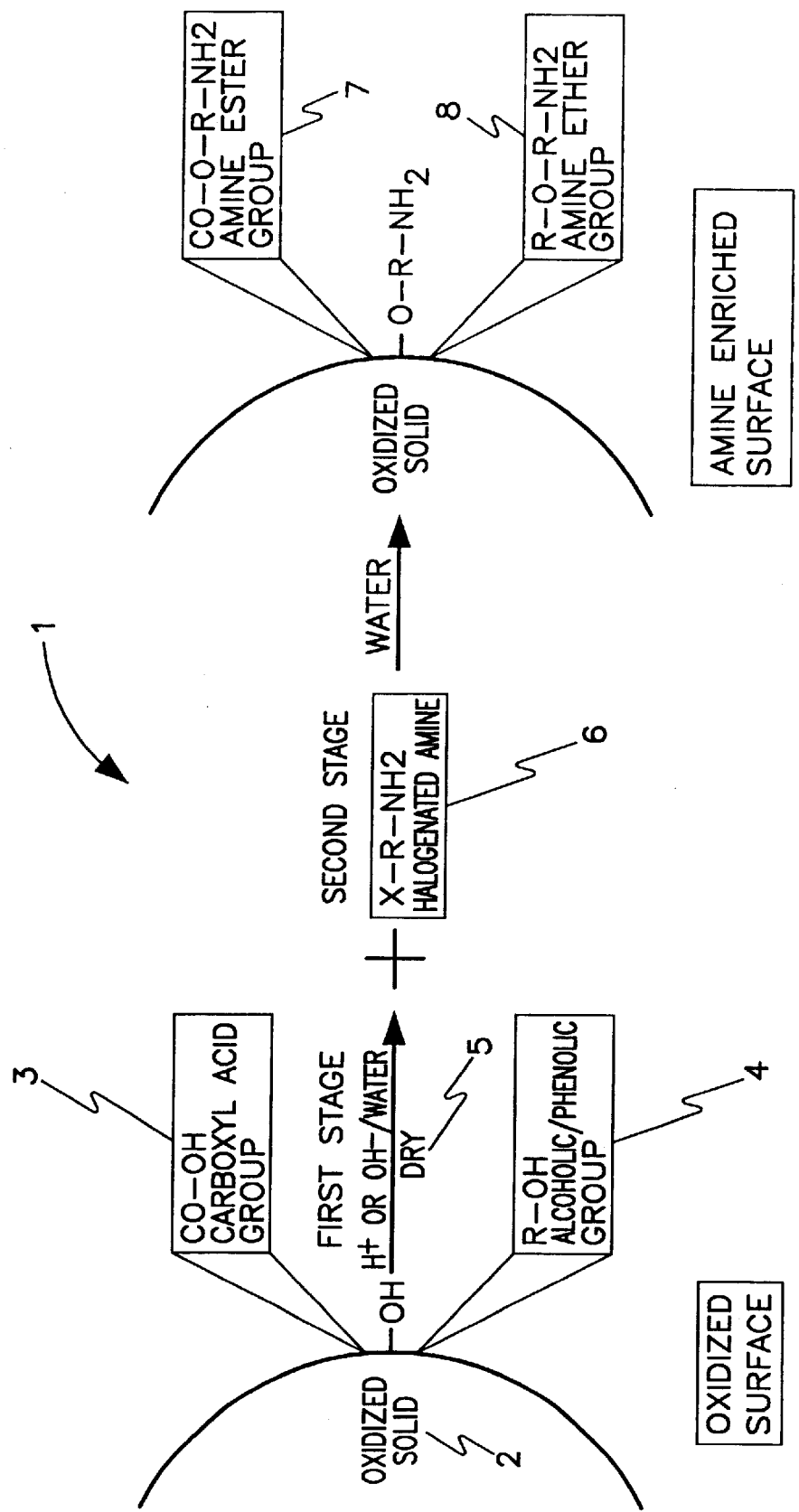
FIG. 1 is a flow chart which outlines the key steps of producing an amine-enriched sorbent, in accordance with features of the present invention.

The protocol, designated as numeral 1 in FIG. 1, has two major steps. The first step involves an initial treatment step of an oxidized solid substrate 2 with aqueous metal hydroxide 5. The substrate is oxidized inasmuch as carboxyl acid groups 3 and/or alcoholic groups 4 already reside on the surface of the substrate 2.

This hydroxide treatment 5 facilitates the formation of metal salts on the surface of the substrate. Such metal salts include metal carboxylates and metal alkoxides, and are formed via the interaction of the metal (from the metal hydroxide) with the carboxyl acid and alcoholic moieties. Suitable metal hydroxides include, but are not limited to alkali metal hydroxides such as those of lithium, sodium, potassium, rubidium, and cesium; and alkaline earth metal hydroxides such as those of beryllium, magnesium, calcium, strontium, and barium. Concentrations of the metal hydroxides can vary from 0.1 M to 5.0 M.

These carboxylates and alkoxides react, in turn, with a substituted amine salt 6. Suitable substituted amine salts include hydrogen halides. Generally, the substituted amine contains one or more moieties selected from the group consisting of methyl, ethyl, n-propyl, isopropyl, n-butyl, isobutyl, t-butyl, allyl, vinyl, cyclopentyl, cyclohexyl, phenyl, naphtyl, and combinations thereof.

The treated substrate is then dried by subjecting the substrate to a temperature sufficiently high, and for a time to evaporate the solvent-carrier of the salt. For example, when water is utilized as the salt carrier, maintaining the substrate at temperatures above the boiling point of the solvent, i.e., 100° C., and for between one and five hours, is suitable.

As noted supra, the second step is the treatment of the prepared solid substrate with an aqueous solution of a halogenated and alkyl or aryl-substituted amine salt. The amine can be a primary, secondary, tertiary, aromatic or cyclic amine. Exemplary alkyl and aryl moieties include, but are not limited to, methyl, ethyl, propyl, and butyl; naphthyl, and phenyl. Reaction occurs between the halogen atom and the carboxyl acid moiety and the alcoholic moiety to form amine ester 7 and amine ether 8 moieties, respectively. The amine functionalities serve as sites for $CO_2$ absorption. Suitable concentration of the amine salt ranges from 0.01 M to 1.0 M.

The final product from the two-step process is then dried at elevated temperatures and is ready for use. Both steps can be carried out at temperatures between 25° C. and 100° C. The reaction time varies from 1 to 24 hours.

The inventors have found that it is also possible to add either molecular acid or the base described supra and the halogenated, substituted amine salt almost simultaneously to the solid substrate. For this method, the molecular acid or metal hydroxide serves as a catalyst for the reaction of the surface with the substituted amine salt. In the event molecular acid is utilized, the acid protonates the carboxylic and alcoholic functionalities on the solid's surface. Suitable, molecular acids include, but are not limited to, hydrochloric acid, hydrobromic acid, hydroiodic acid, sulfuric acid, perchloric acid, and nitric acid. Concentrations of the molecular acids can vary from 0.1 M to 5.0 M.

Support Substrate

Detail

As noted supra, a myriad of substrates can be utilized to supply the oxidized reaction surface. Exemplary solid substrates include, but are not limited to fly ash, carbon derived from fly ash, molecular sieve, activated carbon, silica gel, carbon nanotubes, and pillar clay materials. Generally, substrates with surface areas of approximately 200 m$^2$/gram to 1000 m$^2$/gram are suitable reaction surfaces. Specific examples of substrate preparation are described infra:

Fly Ash: The amine enrichment method was applied to fly ash for which its carbon content had been increased by the column agglomeration method to about 52 wt. %. The carbon content of fly ash is increased because carbon is the active component of fly ash whereas the inorganic components of fly ash show little tendency to act as $CO_2$ sorbents. The enriched fly ash samples showed enhanced $CO_2$ absorption ranging from 11% to 139%, relative to untreated fly ash of 52 wt. % carbon. Relative to regular fly ash of 6–25 wt. % carbon content, the enriched 52 wt. % carbon fly ash samples showed enhanced $CO_2$ absorption ranging from 232% to 615%. Perhaps most importantly, one sample of enriched 52 wt. % carbon fly ash even after use and regeneration showed an enhanced absorption of 183% relative to unenriched 52 wt. % carbon fly ash.

Activated Carbon: The amine enrichment method was also applied to Molecular Sieve 13×(Sud Chemie) and Activated Carbon (Calgon Coal Based). A 16% enhancement of $CO_2$ absorption was found on the treated Molecular Sieve 13×sample. A substantial enhancement of $CO_2$ uptake (358%) was found in one of the amine-treated activated samples (Calgon Coal Based). These results suggest that the nature of the substrate has a significant effect on the reaction between the amine and surface oxide groups.

X-ray photoelectron spectroscopy (XPS) was used to determined the surface composition of these amine-enriched sorbents at the surface depths of 20 armstrongs. The XPS analysis also indicated that more than 1 wt. % of nitrogen was found on the surface of the Calgon coal-based activated carbon sample. That is indicative of amine functionalities bonded to other functionalities on the sorbent's surface.

Silica Gel: Silica gel samples (123A, 123B, 123C, and 122B) were treated with the new method. Two of the treated samples, 123A and 123C showed the decrease of $CO_2$ absorbed amounts by 36% and 51%, respectively. Sample 123B showed the increase of $CO_2$ absorption amounts by 53%. Sample 122B had a $CO_2$ absorption enhancement of 631%, relative to untreated silica gel. Surface analysis of the 122B sample indicated that the surface had nitrogen content of more than 1 wt. %.

Generally, sorbents produced by this invention absorb $CO_2$ from 20° C. to 40° C., retain $CO_2$ from 40° C. to 80° C., then begin to desorb at temperatures in excess of 80° C. Typically, the adsorption occurs in a gas-solid interaction, wherein gaseous $CO_2$ reacts with solid amine located on the surface of the substrate 2.

When the spent sorbent is placed in an anhydrous environment such as pure He gas, the absorbed species can desorb at room temperature. The enriched sorbent can desorb at temperatures as high as 120° C. without thermal degradation of the complex. Thus the amine-enriched substrate can be readily regenerated. An exemplary method for regenerating the sorbent is by exposing the sorbent to a helium stream at temperatures ranging from 80° C. to 120° C. This regeneration can occur in the absence of water.

The presence of moisture is beneficial to the long term stability of the subject material and the carbon dioxide retaining complex.

EXAMPLE

A fly ash sample with an initial carbon content of 8–9 wt. % was used and labeled as sample 59. The sample was first concentrated via the column agglomeration technique to enhance the concentration of carbon to about 52 wt. % to create sample 95. Subsequently and pursuant to the protocol described supra, three different amine treatment procedures were applied to sample 95 as indicated in Table 1.

TABLE 1

Reaction Conditions Summary for Sample 95

| Fly ash sample | Fly ash (grams) | Distilled Water (grams) | KOH(aq) (molarity) | CPAH(aq) (molarity) |
| --- | --- | --- | --- | --- |
| 95A | 10.0 | 500 | 0.1 | 0.04 |
| 95B | 10.0 | 500 | 0.1 | 0.00 |
| 95C | 10.0 | 500 | 0.0 | 0.04 |

An initial 20 wt. % solid/water slurry was prepared and magnetically stirred at room temperature (25° C.). Suspension loads can vary from 1 wt. % to 50 wt. % of solid in water. First, the potassium hydroxide (KOH), then the 3-Chloropropylamine hydrochloride (CPAH) were added to the slurry at a 2.5:1.0 molar ratio of KOH to CPAH. This reaction slurry was agitated for an hour at room temperature and the amine-enriched solid was collected by filtration. The filtered amine-enriched solid sorbent was dried at 105° C. for four hours and subsequently stored at room temperature.

Figure 2:
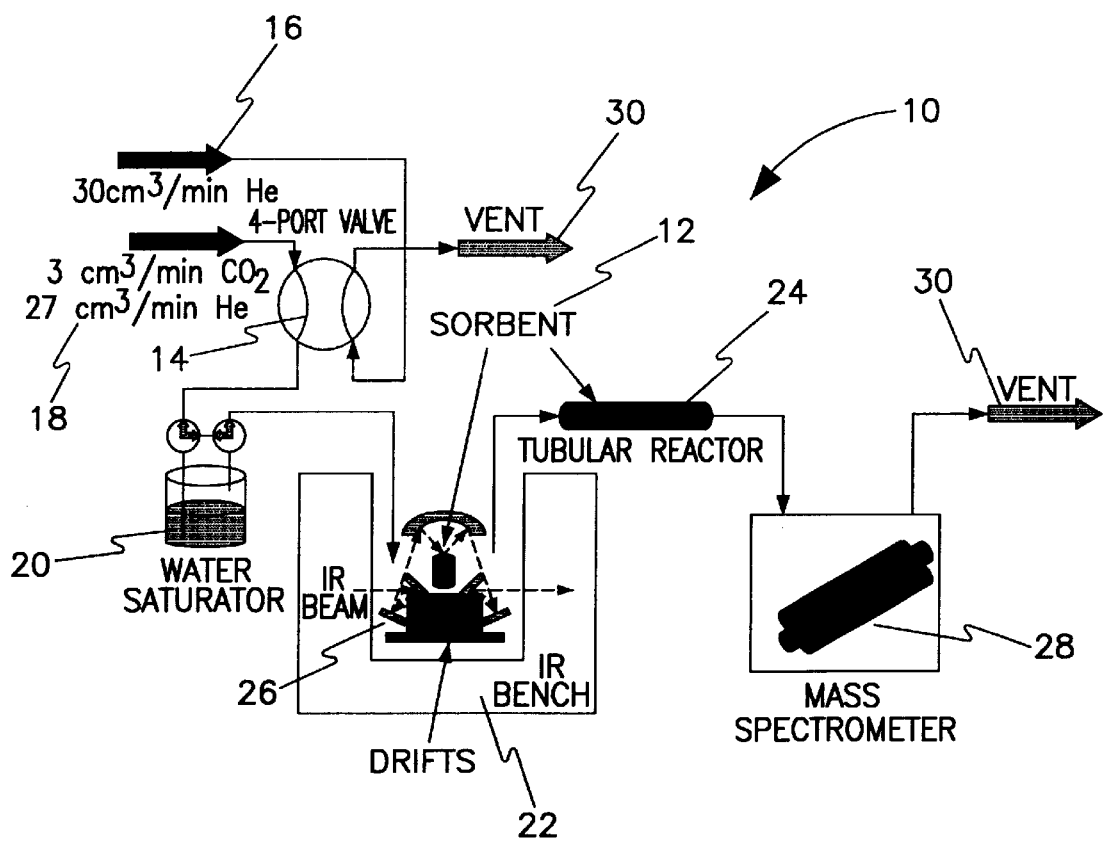
FIG. 2 is a schematic diagram of an experimental system for analysis of $CO_2$ absorption/desorption, in accordance with features of the present invention.

In order to understand the reaction of $CO_2$ on these amine-enriched solids and assess their relative $CO_2$ uptake capabilities, adsorption studies followed by a temperature-programmed-desorption (TPD) technique were conducted under ambient pressure and at temperatures between 30° C. and 120° C. A schematic diagram of the experimental system is depicted in FIG. 2 as numeral 10. A supply of sorbent 12 is required. All gas flows to the system are regulated with mass flow controllers, such as Brooks (Hatfield, Pa.) 5850 mass flow controllers. A 4-port valve 14 allowed for ease of switching between a pure helium supply 16 and a 10% $CO_2$/He 18 flow to the reactor system. Moisture was added to either flow stream via a water saturator 20 maintained at ambient temperature (i.e., approximately 23 to 28° C.), (partial pressure of $H_2O$=23.36 mm Hg).

A sample charge of 100 milligrams (mg) was used in each experiment. Approximately 15 milligrams were placed into a Spectra Tech (Shelton, Conn.) diffuse reflectance infrared Fourier transform spectroscopy (DRIFTS) reactor 22. The remaining sample was placed in a tubular reactor 24 connected to the effluent of the DRIFTS. Separate temperature control systems existed on each reactor.

The sample in the DRIFTS was examined in situ via an infrared spectrometer such as a Nicolet Magna 560 infrared spectrometer (IR) 26 (Madison, Wis.). This allowed for observation of $CO_2$ adsorbate formation/desorption on the sample surface. The gaseous effluent from the DRIFTS-tubular reactor was continuously analyzed by a mass spectrometer such as a Balzers (Balzers, Liechtenstein) QMG 112 mass spectrometer (MS) 28. This allowed for determination of the $CO_2$ concentration in the effluent stream. Effluents were released through vents 30 at both the 4-port valve and after the mass spectrometer.

Prior to any experimental work, all samples, both amine-enriched and unenriched, were first exposed to He at a flow rate of 30 milliliters/minute for 3 hours to clean the sample surface. The effects of this cleaning action was confirmed by observing background signals of both IR and MS. For the $CO_2$ absorption study, the He flow was then replaced with 10% v/v $CO_2$ in He at ambient conditions (25° C. @ 1 atm). The moisture content plays an important role in the $CO_2$ adsorption process as formation of $CO_2$-amine complexes takes place only in the presence of $H_2O$. After the exposure of each sample to 10% $CO_2$ in He, the gas flow was redirected through an $H_2O$ saturator so the gas flow would gain water vapor content. The $CO_2/H_2O/He$ flow over the surface of the sample was maintained for 30 minutes. Then $CO_2/H_2O/He$ gas stream was replaced by $H_2O/He$ flow to expunge the system of gaseous $CO_2$.

For the TPD study, the $H_2O/He$ flow was replaced with pure He flow so as to monitor desorption of adsorbed $CO_2$. Capture capacities of the different amine-enriched samples were calculated by analysis of the $CO_2$ (m/e=44) MS desorption profile.

The detailed chemical analyses of the amine-enriched sorbents along with the untreated samples are illustrated in Table 2 (infra). A significant increase of nitrogen contents from 0.6 wt. % to 0.73 wt. % was observed for the treated samples. Generally, nitrogen content can increase from approximately 0.2 weight percent to 20 weight percent. Further, the oxygen content also increased from 0.77 wt. % to as high as 2.81 wt. % on the amine-enriched samples. Generally, oxygen content increases of between 0.2 weight percent and 30 weight percent are typical.

The increase of the nitrogen contents of the treated samples suggested that some nitrogen-containing species were attached and/or bonded to the treated samples. This implies the presence of amine species on the treated samples.

Figure 3:
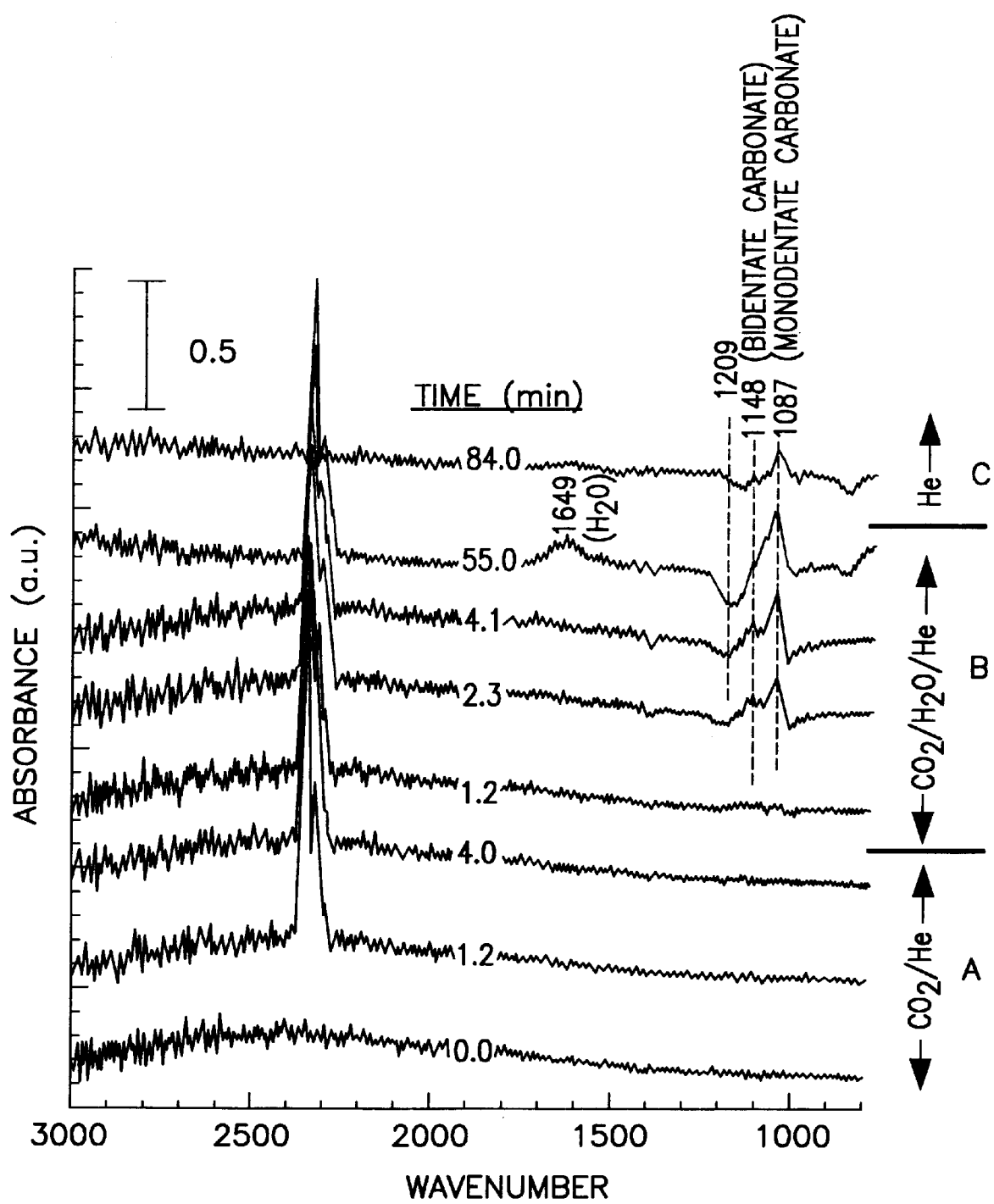
FIG. 3(a–c) is an illustration of the diffuse reflectance infrared Fourier transform spectroscopy (DRIFTS) analysis of $CO_2$ adsorption on carbon enriched fly ash at ambient temperature, in accordance with features of the present invention.
Figure 4:
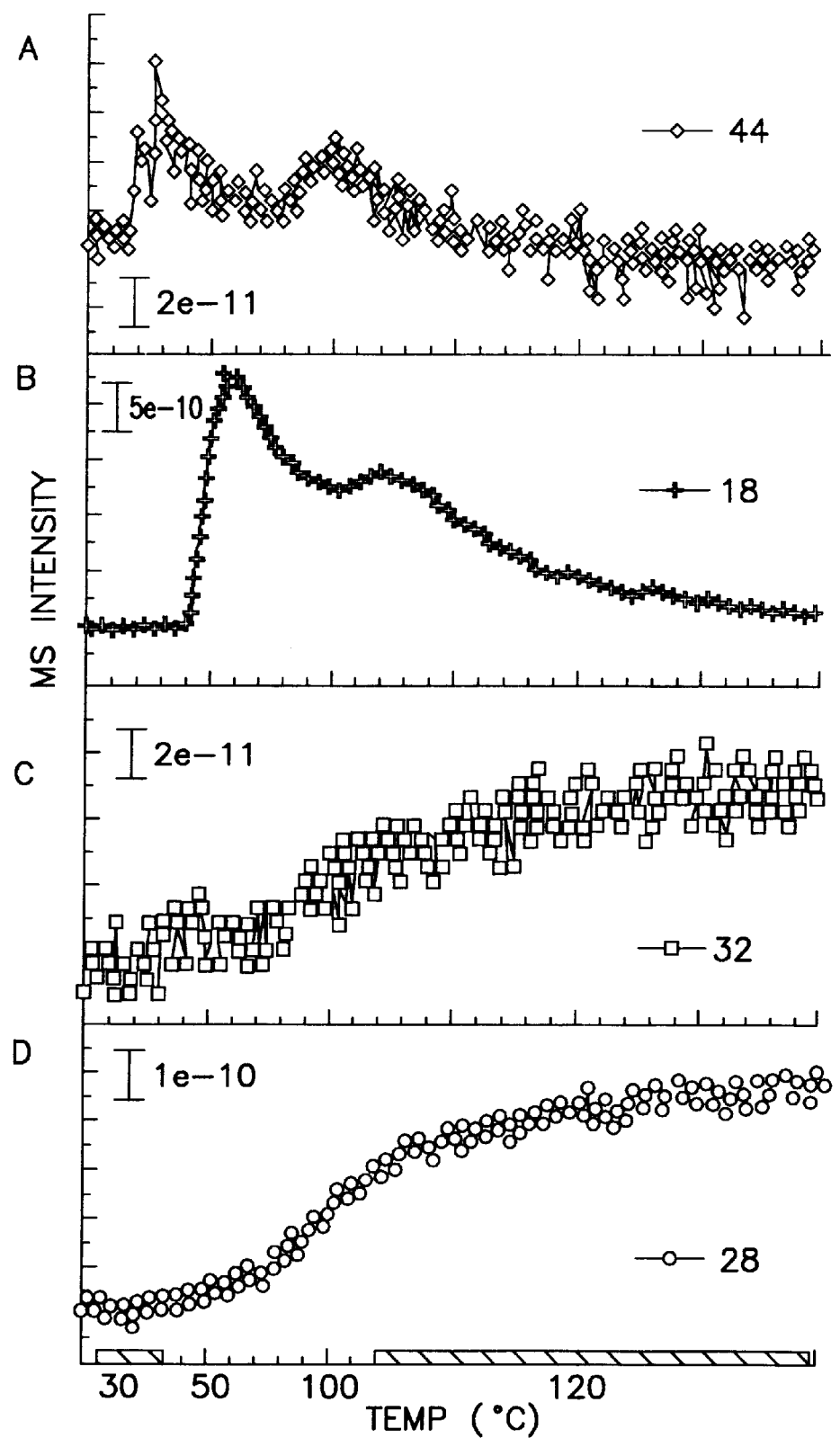
FIG. 4(a–d) is an illustration of the desorption mass spectrum of $N_2$ (or CO), $CO_2$, $O_2$ and $H_2O$ as a function of temperature ramping, in accordance with features of the present invention.

Typical DRIFTS and TPD results from sample 95C are given in FIGS. 3 and 4, respectively. FIG. 3 displays the diffuse reflectance infrared Fourier transform spectroscopy (DRIFTS) analysis of $CO_2$ adsorption over Sample 95C at ambient temperature. The lower portion, FIG. 3a is a surface IR spectrum when the gas flow was $CO_2$/He, the middle portion, FIG. 3b, a surface IR spectrum for a gas flow of $CO_2/H_2O/He$, and the third and upper portion, FIG. 3c, a surface IR spectrum for a gas flow of He only. For all three portions, the times indicated in FIG. 3 are relative to points of gas feed composition changes.

TABLE 2

TPD $CO_2$ Desorption Results of Amine-Enriched Sorbents

| Sample # | Treatment methods | N(wt. %) | O(wt. %) | $CO_2$ released ($\mu$mol/g sample) |
|---|---|---|---|---|
| 59 (7 wt. % carbon) | none | 0.21 | 0.61 | 24.4 |
| 95 (52 wt. % carbon) | none | 0.6 | 0.77 | 72.9 |

TABLE 2-continued

TPD $CO_2$ Desorption Results of Amine-Enriched Sorbents

| Sample # | Treatment methods | N(wt. %) | O(wt. %) | $CO_2$ released ($\mu$mol/g sample) |
|---|---|---|---|---|
| 95A | A[1] | 0.73 | 2.81 | 81.1 |
| 95B | B | 0.66 | 1.78 | 117.9 |
| 95C | C | 0.65 | 2.28 | 174.5 |
| 95C (after regeneration) | C | 0.65 | 2.28 | 140.6 |

[1]A, B, and C refer to the treatment methods for these samples in Table 1 supra.

Exposure of the surface to dry $CO_2$/He flow did not lead to any observable surface $CO_2$-amine complex formations. Only gaseous $CO_2$ bands centered around 2350 cm$^{-1}$ were observed, FIG. 3a. Subsequent to switching the $CO_2$/He flow to a flow of $CO_2/H_2O/He$, two distinct IR bands were observed at 1148 cm$^{-1}$ and 1087 cm$^{-1}$, FIG. 3b. These bands weaken with He flow only as shown in the top tracing of the figure, FIG. 3c. These results further confirmed that the absorption of $CO_2$ does not take place in the absence of water and that once flow is switched to He only, the absorbed species can desorb at room temperature. The IR bands were assigned tentatively to bidentate carbonate, monodentate carbonate, and/or carbamate, respectively. The $CO_2/H_2O/He$ stream was then switched to He flow only until the removal of gaseous $CO_2$ was completed.

For the TPD study, the pure He flow was utilized to monitor desorption of adsorbed $CO_2$. FIG. 4 shows the desorption mass spectra for Sample 95C of the $N_2$ (or CO), $CO_2$, $O_2$, and $H_2O$ as a function of temperature ramping. FIG. 4a is the desorption mass spectrum for species with a mass-to-charge ratio (m/e) of 44, namely $CO_2$. FIG. 4b for species with a m/e of 18, that is, $H_2O$, FIG. 4c for species with a m/e of 32, $H_2$, and FIG. 4d for species with a m/e of 28, $N_2$ and/or CO (carbon monoxide). The "2e–11" designation on FIG. 4a and similar markings on FIGS. 4b–d refer to millivolts (mv) which is the unit of measurement for the y-axes. In FIG. 4a there are two desorption peaks centered around 40° C. and 110° C. from $CO_2$. In FIG. 4b there are two analogous peaks centered around 60° C. and 120° C. from $H_2O$. These four peaks may correlate to the decomposition of $CO_2$-amine complexes, monodentate carbonate, and bidentate carbonate.

FIG. 4d m/e of 28 desorption spectrum corresponds to either carbon monoxide or nitrogen desorption.

To prevent the desorption of amine-$CO_2$ complexes during the purging of gaseous $CO_2$, the $CO_2/H_2O/He$ stream was replaced with $H_2O/He$ instead of only He at the completion of the absorption phase. The presence of water maintains the complexes whereas a flow of He only would cause desorption of $CO_2$. The presence of moisture is clearly beneficial to the long-term stability of amine-enriched substrate.

To further investigate the stability of the surface amine species, an additional experiment was conducted on Sample 95C. The sample was cooled to ambient temperature (i.e., approximately 25° C.) at one atmosphere, and its surface was cleaned by He flow for 3 hours. The adsorption/desorption cycle was then repeated. It was found that its uptake capability was only slight degraded after being heated to 120° C. Sample 95C absorbed 140.6 $\mu$mole per gram after regeneration as opposed to 174.5 $\mu$mol per gram when the sample was fresh. This is a considerable improvement over the prior art which has seen serious degradation of $CO_2$ sorbents upon heating. Further, these results for Sample 95C after heating are still good $CO_2$ capture results and strongly suggested that Sample 95C could be regenerated.

In summation, the amine-enriched samples chemically adsorb $CO_2$ and water upon contact with a gaseous stream and from the amine complexes. Temperature gradients drive the reaction between carbon dioxide, water, and amine in the reverse direction and regenerate the amine and release the absorbed carbon dioxide and water.

While the invention has been described with reference to details of the illustrated embodiment, these details are not intended to limit the scope of the invention as defined in the appended claims.

What is claimed is:

1. A method for producing an amine-enriched sorbent which comprises:
    (a) treating an oxidized surface with base, and;
    (b) contacting the treated surface with a substituted amine hydrogen halide, wherein the substituted amine contains one or more moieties selected from the group consisting of methyl, ethyl, n-propyl, isopropyl, n-butyl, isobutyl, t-butyl, allyl, vinyl, cyclopentyl, cyclohexyl, phenyl, naphtyl, and combinations thereof.

2. The method as recited in claim 1 wherein the amine is a primary amine, or a secondary amine, or a tertiary amine, or an aromatic amine, or a cyclic amine.

3. The method as recited in claim 1 wherein the amine hydrogen halide moieties contain halide selected from the group consisting of mono, di, tri, tetra, penta, hexa, hepta, octo, nona, deca, undeca, and combinations thereof.

4. The method as recited in claim 1 wherein steps a and b are conducted at temperatures between 25° C. to 100° C.

5. The method as recited in claim 1 wherein the step of treating the surface with a base comprises contacting the surface with a metal hydroxide.

6. The method as recited in claim 5 wherein the metal is an alkali metal selected from the group consisting of lithium, sodium, potassium, rubidium, and cesium.

7. The method as recited in claim 5 wherein the metal is an alkaline earth metal selected from the group consisting of beryllium, magnesium, calcium, strontium, and barium.

8. The method as recited in claim 1 wherein the surface has a surface area of between approximately 300 $m^2$/gram and 600 $m^2$/gram.

9. The method as recited in claim 1 wherein the amine moiety bonds to the surface as an oxygen-containing compound selected from the group consisting of an amine ester, an amine ether, and combinations thereof.

10. A method for removing carbon dioxide from a fluid, the method comprising contacting the fluid with an amine-enriched sorbent as recited in claim 1.

11. The method as recited in claim 10 wherein the sorbent adsorbs $CO_2$ at a temperature of between 20° C. and 80° C.

12. The method as recited in claim 10 wherein the sorbent is regenerated in situ at temperatures ranging from 80° C. to 120° C.

13. A process for producing an amine-enriched sorbent which comprises treating a surface with a substituted amine hydrogen halide in the presence of a catalyst, where the catalyst is an acid selected from the group consisting of hydrochloric acid, hydrobromic acid, hydroiodic acid, sulfuric acid, perchloric acid, and nitric acid and having a concentration of between 0.1 M and 5.0 M.

14. The method as recited in claim 13 wherein the surface has a surface area of between approximately 300 $m^2$/gram and 600 $m^2$/gram.

15. The method as recited in claim 13 wherein the sorbent is produced at a temperature selected from between 25° C. and 80° C.

* * * * *